Oct. 22, 1968  H. KORTHAUS ETAL  3,407,318
ELECTROMOTIVE ADJUSTING DEVICE
Filed Jan. 5, 1966  3 Sheets-Sheet 2
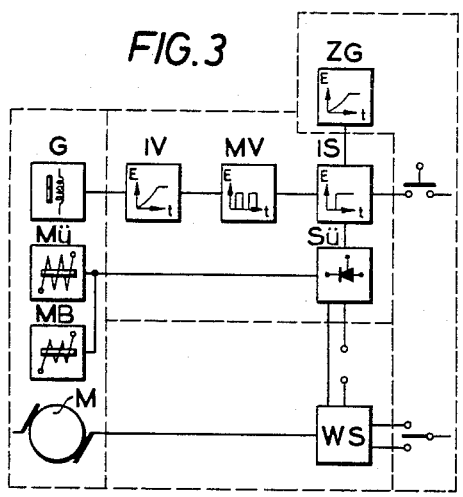
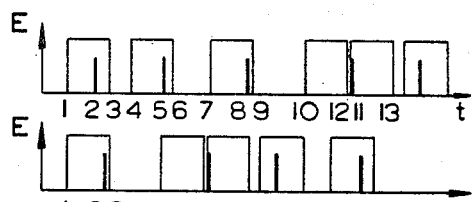
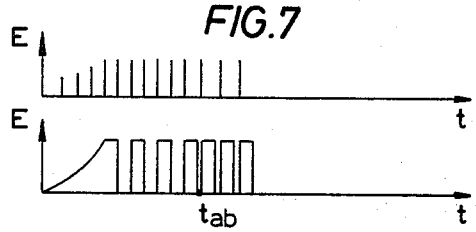
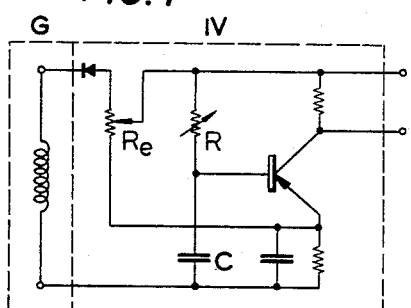
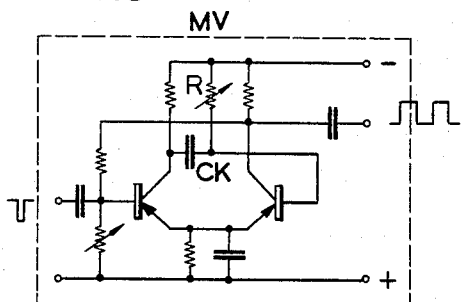
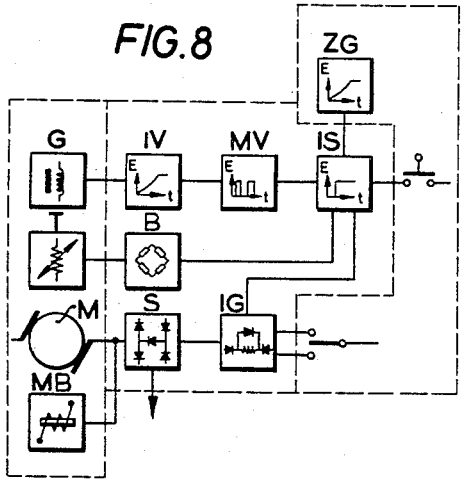
INVENTORS
Helmut Korthaus
Richard Vilke
By Ernest Montague
Attorney

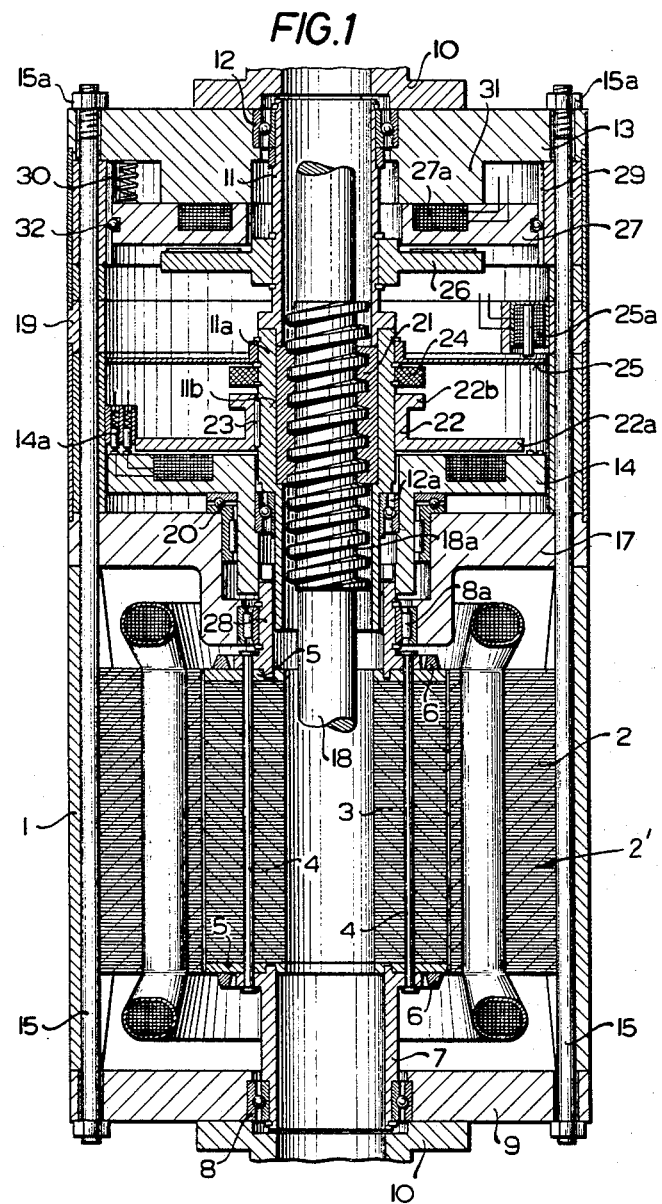

United States Patent Office 3,407,318
Patented Oct. 22, 1968

3,407,318
ELECTROMOTIVE ADJUSTING DEVICE
Helmut Korthaus, Fernblick 3, Wuppertal-Barmen, and Richard Wilke, Schwelmestrasse 51, Schwelm, Germany
Filed Jan. 5, 1966, Ser. No. 518,803
Claims priority, application Germany, Jan. 13, 1965, K 55,000
16 Claims. (Cl. 310—75)

ABSTRACT OF THE DISCLOSURE

An electromotive adjusting device comprising a rotor of an electric motor drivable in a predetermined direction, and means for transforming the rotary movement of the rotor into an axial linear pushing or pulling movement of a spindle adjustment rod. The spindle adjustment rod is secured against rotation and a spindle nut is provided with which the spindle adjustment rod cooperates, the spindle nut being operated by the electric motor and a magnetic brake operating on the spindle nut.

---

The present invention relates to an electromotive adjusting device in which the rotary movement of a rotor of an electric motor drivable in a predetermined direction is transformed into an axial linear pushing or pulling movement of a spindle adjustment rod which is secured against rotation, which spindle adjustment rod cooperates with a spindle nut operated by the electric motor, as well as with a magnetic brake working on the spindle nut.

An electromotive adjusting device including means for transforming the rotary motion of a rotor of an electric motor into an axial linear pushing or pulling movement of a spindle adjusting rod, secured against rotation, has been disclosed in Patent No. 3,206,628 to Helmut Korthaus and Richard Wilke, dated Sept. 14, 1965, which device includes a main outer housing, an electric motor mounted in the main outer housing and comprising a rotor and a stator surrounding the rotor, a spindle nut co-axially disposed relative to and operated by the electric motor, a spindle adjusting rod threadedly received in the spindle nut, a magnet brake operatively connected with the spindle nut, a drive magnet member disposed axially adjacent the electric motor within the main outer housing and affecting the spindle nut and controllable for the maximum push and pull, respectively, whereby the drive magnet constitutes a disc-like first structural unit and the magnet brake is disposed axially adjacent the drive magnet member and forms a second structural unit and finally a plurality of axially and laterally securing bolts are mounted in the main outer housing.

The electromotive adjusting device disclosed in said patent includes a spindle nut which is mounted displaceably, whereby the axial play is limited by abutments, which are pre-set by a coupling magnet arrangement.

It is one object of the present invention to provide an electromotive adjusting device, which amounts to an advantageous development of the structure of said patent.

It is another object of the present invention to provide an electromotive adjusting device, wherein the spindle nut engaging the spindle adjusting rod is designed as an exchange spindle nut mounted within a spindle nut body secured against rotary and axial displacement, whereby the material, of which the exchange spindle nut is produced, is accommodated to the material of the spindle adjusting rod in order to bring about the longest life and the least friction losses, and whereby the nut receiving body, consisting preferably of steel, is mounted axially not displaceably between pressure bearings in the prearranged housing. The nut receiving body comprises preferably two plug bushings interlocking over parts of their axial length and connected with each other, one of the plug bushings receiving the spindle nut, which sits axially with one of its end faces on the base of a stepped-up bore of this half, while the other plug bushing extends with an axial neck portion into the plug bushing carrying the spindle nut and which abuts with its free end face of its axial half portion on the other end face of the spindle nut for axial retaining of the latter, as well as overlaps with a radial collar the free end face of the plug bushing disposed opposite the spindle nut and is here connected with the latter. Furthermoree, a driving force transmitting member is provided on the outer periphery of the spindle nut bushing, which driving force transmitting member is secured against rotation, however, axially displaceable on key formations or the like, whereby said driving force transmission member is designed preferably in form of an iron disc, which has about C- to U-shaped cross-section and thus forms two flanges of different diameters disposed on top of each other and axially spaced apart from each other. The annular flange of larger diameter having on its radial face coupling grooves or the like cooperates with a coupling magnet body axially pre-set to the annular flange of larger diameter, which coupling magnet body has under certain circumstances on its coupling face with the annular flange likewise coupling grooves and causes in its excited state a joining of the driving force transmission member. The other annular flange of smaller diameter cooperates, upon disconnecting the drive force coupling magnet, with an axially secured permanent magnet arrangement which follows axially this annular flange and is coupled for joint movement with the spindle nut bushing. Furthermore, a control member is provided, still further axially set-off on the spindle nut bushing, axially secured thereon and coupled for joint movement in the form of an iron disc carrying teeth at its periphery, whereby a self-induction coil is provided at a slight distance above its peripheral teeth arrangement. The pulses of the self-induction coil serve the control of the excitement of the coupling magnet, on the one hand, and of the brake magnet, on the other hand, whereby the brake magnet functions as a brake upon rendering the brake magnet inoperative.

The proposed rigid and non-displaceable mounting of the spindle nut, designed in accordance with the present invention, has at first the advantage that upon surpassing of the highest pressure on the spindle rod, no more a sudden return movement in the direction of the counter-pressure takes place, which was experienced by the axial play within the coupling magnet arrangement in the known structure.

It is a further object of the present invention to provide an electromotive adjusting device, wherein the rotation-symmetric body of said patent is no more required and in this manner a reduction of the rotating masses is brought about. Furthermore, in accordance with the present invention, an appreciable portion of bearings is omitted, so that, thereby, a still simpler and safer structure is obtained.

Furthermore, it is no more required that the magnetic coupling arrangement controls now with its pulling force the released highest pressure or the highest pull of the spindle rod, since now the excitement or nonexcitement, respectively, of the magnetic coupling arrangement takes place now electronically in dependency upon the number of revolutions of the motor. This circuit is simpler and the complicated devices required in accordance with the structure of said prior patent are eliminated, which devices are supposed to control the excitement of the coupling magnet arrangement provided in said prior patent corresponding to the received current of the driving motor. In accordance with the present invention, the excitement of the coupling magnet arrangement can be adjusted to a permissible highest value, which does not require any change. By such an arrangement a simplification is brought about.

Since in accordance with the present invention, the spindle nut is now immovably mounted, the mechanical operation of the contacts of the structure of said prior patent is omitted, which causes the stopping of the driving motor and the excitement of the magnetic brake. In accordance with the present invention, the provision of the disconnection and of the stopping processes, performed until now by mechanical contacts, is replaced by an electronically working control device which operates without contacts, which control device becomes effective upon reduction of the number of revolutions of the spindle nut. If the counterpressure exerted upon the spindle rod surpasses a predetermined value, the number of revolutions of the driving motor is reduced as a matter of course. Generally, however, the number of revolutions of the motor depends upon the rotary movement which is to be obtained. It is, thus, possible to set the number of revolutions of the motor and, in the present instance, also the number of revolutions of the spindle nut as a direct value for the pull- or push-force obtained from the spindle rod.

In accordance with the present invention this dependency upon the number of revolutions, that means, the reduction of the number of revolutions to a predetermined number of p./min. is used such to start the disconnecting procedure. The number of revolutions, at which the disconnecting procedure should be performed, is pre-selectable, that means, adjustable. Upon reaching this predetermined number of revolutions, the excitement of the magnet coupling is shut-off by means of an electronic device and, thereby, also the spindle nut and the spindle rod is stopped without a sudden return movement, while the motor can freely continue its rotation. In accordance with the present invention it is, however, also possible to stop in addition simultaneously the motor, in case this is desirable.

In accordance with said prior patent, upon shutting-off of the excitement of the magnet coupling simultaneously, the magnet brake is electrically connected and secures the spindle nut together with the spindle rod immovably in the set disconnected position.

In accordance with the present invention the brake effect of the magnet brake is now obtained such that the magnet brake is shut-off electrically simultaneously with the motor. The electro magnet of this magnet brake can thus be fed jointly with the electromagnet of the couplnig with alternating current or with direct current by means of pre-arranged rectifiers. This arrangement has the advantage over the structure of said prior patent, that an additional electrical control device for the magnet brake can be omitted.

As already disclosed in said prior patent, a particularly simplified design is suitable in accordance with FIG. 3 of said prior patent, particularly for motors with a lower moment of inertia and lower output. In accordance with the present invention, it is even possible in this case to omit the magnetic coupling by means of the electronic arrangement in these motors with a small moment of inertia and to stop the motor only by means of the electronic device and to make effective the magnet brake, if the number of revolutions of the motor and of the spindle nut, respectively, has reached the pre-set selected value of number of revolutions.

If the settable number of revolutions for the desired disconnection is calibrated in push and pull values, then in this manner the desired push- and pull-force can be set by simple operation of a rotary knob, as set forth below, at which push- and pull-force the adjustment device comes to a standstill.

It is yet another object of the present invention to provide an electromotive adjusting device, in which at the driven end of the spindle rod a damping coupling device, for instance, in the form of a rubber-metal connection is provided, instead of a forked head, as a coupling member. It is then also possible to bring to a standstill even motors with larger moments of inertia and larger output without stopping this magnetic coupling directly by the electronic means and to secure in the disconnected position the spindle nut and the spindle rod by the magnet brake. This embodiment constitutes a further simplification of the present invention.

It is yet another object of the present invention to provide an electromotive adjusting device, wherein for the increase of the life and the operational safety of the adjusting device, the temperature of the stator winding of the driving electric motor is likewise electronically secured, whereby upon surpassing of a permissible temperature, the motor is switched-off without deceleration and the magnet brake is switched on. In the same direction of the increase of the operational safety, it is provided that the spindle nut is no more designed as one constructional part, rather the actual spindle nut is exchangeable, since it constitutes jointly with the spindle rod the only part of the adjusting device which is subjected to wear.

In addition, to the simplified exchangeability and the economical design of the device by the exchangeable spindle nut, the possibility is also provided for this nut to use now material of the highest value, since this nut constitutes only a small structural part in comparison with the structure of said prior patent, for which small part not much material is required. It is, also feasible to use for the spindle nut high value synthetic material, which has a particularly low friction coefficient and which in addition to a high life of use, does not require any lubrication. It is furthermore also possible to use special nuts of a highest efficiency, for instance, with a ball thread.

It should also be emphasized that it is of course also possible to produce the spindle adjusting rod itself even, for instance, for operational conditions with aggressive vapors or gases, of synthetic material and the spindle nut consisting of a suitable material of metal or of likewise synthetic material.

With these and other objects in view which will become apparent in the following detailed description, the present invention will be clearly understood in connection with the accompanying drawings, in which:

FIGURE 1 is an axial section of the electromotive adjusting device, designed in accordance with the present invention;

FIG. 2 is a fragmentary bottom plan view of the iron disc with a self-induction coil; and FIG. 3 is a block circuit diagram illustrating the cooperation of the particular electronic construction sets, switch, brakes and setting motor;

FIG. 4 is a principal circuit diagram of the integrated retarding circuit IV;

FIG. 5 is a principal circuit diagram of the monostable multivibrator MV with adjustable time constant;

FIG. 6 is a graph indicating the starting pulses of the monostable multivibrator and its influence by the incoming pulses which arrive from the pulse generator by the integrated retarding circuits;

FIG. 7 shows graphically this effect of the integrated retarding circuit to the outgoing pulses of the monostable multivibrator MV;

FIG. 8 is a block circuit diagram similar to FIG. 3 but without movable contacts, i.e., fully electrically controlled without contacts;

Figure 10:
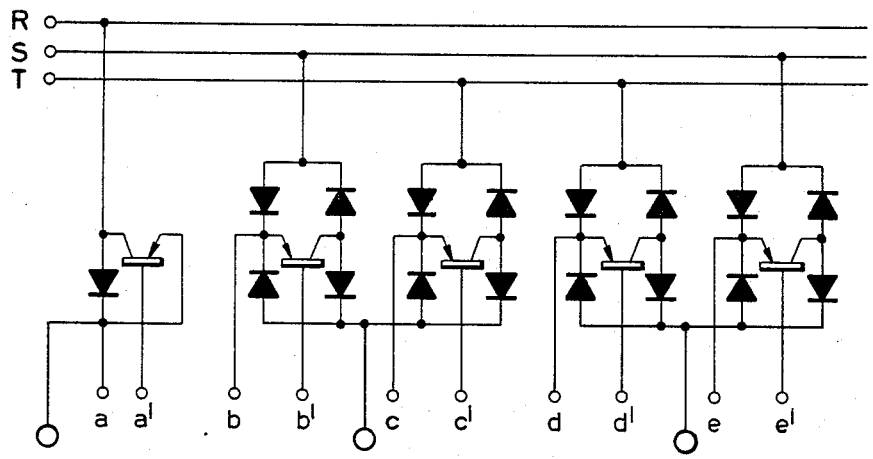
FIG. 10 is a circuit for the impulse sender for the turning circuit without contacts.

Referring now to the drawings and in particular to FIGS. 1 and 2, the electromotive adjusting device comprises a motor 2′, shown in the bottom portion of FIG. 1, which motor includes, exactly as disclosed in said prior patent, a stator 2 with its winding and a rotor 3. The stator package is produced as a unit with the housing 1, whereby the housing 1 can comprise, for instance, aluminum pressure casting. The rotor 3 has a bore through which a spindle 18, having a thread 18a, projects freely. The rotor sheets have bores and carry on both sides flanges 5, which are pressed in already during the manufacture of the rotor body and are retained in position by short-circuiting rings 6. One of the flanges 5 engages on one side a hollow body 7 and the other of the flanges 5 engages a hollow body 28. The hollow bodies 7 and 28 are rigidly connected with the rotor 3 by a plurality of bolts 4 distributed along the periphery of the rotor 3 and projecting through the latter. The hollow body 7 constitutes thus the flanged one side of the hollow shaft of the rotor 3 and is mounted in the housing cover 9 by means of pressure ball bearings 8. A closing cover 10 closes the ball bearings 8 and the hollow shaft from the outside and prevents the penetration of soil into the bearings 8. The hollow shaft 28 disposed on the other side of the rotor 3 is mounted in roller-supporting bearings or in sinter slide bearings 8a in an annular cover-like intermediate housing part 17. This upper housing part 17 of the motor housing constitutes simultaneously the lower housing cover of the axially engaging housing.

In this housing part 17 are disposed the coupling magnet arrangement and the releasing electronic device. The upper annular cover 19 closing this housing portion 17 constitutes the lower part of the adjacent axially disposed housing which contains the magnet brake. The spindle nut body 11 projects through these two housing parts 17 and 19 and is non-displaceably mounted in the upper bearing cover 13 by means of a pressure ball-bearing 12, and has for this purpose a collar by which it supports itself against this pressure bearing 12. A closing cover 10 is also mounted on this cover 13.

The body 11a supports itself against the housing cover 17, which closes the motor housing by means of a pressure ball bearing 12a likewise by means of a collar, whereby this pressure ball bearing 12a in turn supports itself by means of a bearing arrangement 20, which supports the rotating part of the coupling magnet 14 against the upper annular cover 17.

The spindle nut body comprises two tubular bushings 11 and 11a joined together by a threaded connection, whereby the lower tubular bushing 11a has a widened portion 11b for the reception of the exchangeable spindle nut 21. The two tubular bushings 11 and 11a can be made of steel, while the spindle nut 21 is suitably made of bronze. By means of a groove and key formations this spindle nut 21 is protected against rotation in the bushing 11a receiving the spindle nut body and furthermore it is retained against axial displacement.

The exciting coil of the coupling magnet 14 obtains its current feeding in a known manner, by means of two slip rings and two spring biased coal brushes 14a. A driving force transmission member, in the form of an iron disc 22 is axially movably disposed above the coupling magnet 14 on the spindle nut body 11 and 11a. The iron disc 22 is of L-shaped cross-section and has an axially disposed portion which has feathers 23 at its inner face, which feathers 23 permit a reciprocating axial movement of the iron disc 22 in longitudinal grooves of the spindle nut body 11 and 11a. The iron disc 22 has a flange 22a of larger diameter and a flange 22b of smaller diameter. A permanent ring magnet 24 is pre-set to the flange 22b in axial direction which permanent ring magnet is non-displaceably disposed on the spindle nut body 11 and 11a and secured by means of resilient rings.

If now the magnet coil of the coupling magnet 14 is excited, the iron disc 22 is pulled to the coupling magnet 14. In accordance with the structure of said prior patent, such iron disc and also the coupling magnet 14 may be grooved in order to bring about a better adherence for the transmission of rotary moments. If the magnet coil of the coupling magnet 14 is without current, the iron disc 22 is pulled by means of its flange 22b towards the magnet 24 and thereby the connection of forces between the coupling magnet 14 and the iron disc 22 is released. The distances between the magnet 24 and the flange 22b and the force of the magnet 24 are measured such that the iron disc 22 is pulled upwardly also in vertical position and thus the coupling if released with the coupling magnet 14. On the other hand, the pulling force of the coupling magnet 14 is so great, that the pulling force between the magnet 24 and the flange 22b is easily overcome upon excitement of the coupling magnet 14.

Another iron disc 25 is rigidly secured to the spindle nut body 11 and 11a above the magnet 24, so that the iron disc 25 joins the rotation of the spindle nut body 11 and 11a. As can be ascertained from FIG. 2 of the drawings, in which a portion of the disc 25 is disclosed, the disc 25 has at its outer margin rectangularly shaped teeth 25b, which pass by at a small distance on a small self-induction coil. This coil is disposed in a magnet system 25a designed as a pot in the ring 19.

The magnet brake arrangement is provided in the upper housing part, which is formed by the ring 19 and the upper closing cover 13. The magnet brake arrangement comprises an iron ring 26 secured to the spindle nut body 11 and 11a by means of wedge- and resilient-rings. A body 27 is axially behind the iron ring 26, which body 27 can be made of massive iron for direct current excitement of the coordinated magnet coil 27a and, in case of alternating current excitement of the magnet coil 27a, must comprise of a plurality of layers of sheet metal.

This ring-shaped body 27 slides over balls 32 equally distributed over the periphery in corresponding grooves 29 of the upper housing part. Likewise springs 30, equally distributed along the periphery of the disc 27, push the disc 27 axially toward the iron disc 26, if the magnet coil 27a is not under current. If the magnet coil 27a is excited, the disc 27 is pulled against the force of the springs 30 towards the ring cover 31 and adheres thereto, so that the brake effect between the disc 26 and the body 27 is released. It is suitable that the disc 26 or the body 27 is provided at the opposite faces with a brake layer, in order to reduce the wear between the two parts.

The entire structure is designed such that it is possible without difficulty, upon removing the housing cover 13 by releasing the securing nuts 15a of the screw bolts 15, holding together the entire structural unit, to remove at first the disc 27 and, thereafter, upon removing the coil 25a, the entire spindle nut body 11 and 11a with all parts secured thereto from its bearing seat 12a.

The cooperation and interoperation of the individual parts of the adjusting device as disclosed in FIGS. 1 and 2 can be ascertained from the circuits disclosed in FIGS. 3 to 8 and is set forth below.

Referring now again to the drawings and in particular to FIG. 3, the motor of the adjusting device can be switched-on normally in a desired rotary direction and also be shut-off by means of a turning relay arrangement WS. If the motor is switched-on, the disc 25 is subjected to rotation and will produce impulses by means of the self-induction coil 25a, the frequency of the impulses being dependent upon the number of teeth 25b (FIG. 2) on the disc 25 and from the number of revolutions with which the motor normally rotates. Furthermore, a controllable thermionic relay Sü is provided, so that simultaneously with the operation of the turning relay arrangement WS, the thermionic relay Sü, which can be replaced by a simpler but not as safely operating auxiliary relay, receives a switching signal and excites the magnet coil of the coupling 14 (Mü) and simultaneously the magnet coil of the magnet brake 27 (MB). The opening magnet brake releases the disc 26 at the moment of switching on and simultaneously the driving force transmission member 22 is connected by the locking of forces with the magnet of the coupling 14. The spindle rod 18 is then moved by the likewise rotating spindle nut body 11 and 11a, since it is prevented from rotation by itself. The pulses initiated from the self-induction coil G (25a) are transmitted to a mono-stabile multi-vibrator MV (FIG. 5) by means of an integrating retarding circuit IV (FIG. 4). The pulses emerging from the mono-stabile multi-vibrator are amplified in a pulse amplifier IS.

The input pulses of the mono-stable vibrator are indicated in FIG. 6 by the numbers 1, 2, 4, 5, 7, 8, 10 and 11.

As can be ascertained from FIG. 6 of the drawings, the (left) short and somewhat pointed negative input pulses, which originate from the self-induction coil G, are transformed in the vibrator MV into rectangular pulses (right), the pulse duration of which is determined by the value of the resistance R and of the condenser CK. The two circuit members R and CK are knowingly a measure for the intermediate stable state of the mono-stabile multi-vibrator. This once set time of the intermediate stable state is indicated in FIG. 6 by the rectangles between 1 and 3, 4 and 6, 7 and 9, 10 and 12. If the second pulse, which is transmitted from the self-induction coil G to the multi-vibrator MV, falls into the intermediate stable time period, namely point 2, point 5 and point 8, then upon termination of the intermediate stable time period, the mono-stable multi-vibrator MV is without current at its output. If, however, the pulse falls, as under 11, later then the duration of the intermediate stable state, then, upon receiving this impulse, the mono-stable multi-vibrator MV is again directly switched and again a rectangular pulse 11, 13 results immediately.

In the lower portion of FIG. 6, the same procedure is disclosed once more, and in particular with different pulse distances. One recognizes from a comparison of these two showings, that an extension of the impulse duration in the upper showing does not bring about at first a change of the output rectangular pulses, while in the lower showing already a small retardation of the pulses 2, 5 and 8 reduces, already after a short time interval, a change of the output rectangular pulses. This means, in other words, that by change of the time of the intermediate stable state 1–3, etc., the response moment of the change of the output pulses of this mono-stabile multi-vibrator MV is adjustable.

If now during normal operation of the adjusting device a "normal pulse frequency" is assumed, then the time of the sudden changes of the output pulses of the mono-stabile multi-vibrator MV results from the timely spacing of the pulses 2, 5 and 8, respectively from the relaxation point of the intermediate stable state 3, 6 and 9, respectively. The larger this timely distance 2–3, the larger can become the pulse distance, before the change of the output rectangular pulses takes place. The distance 2–3 determines, however, the permissible reduction of the number of revolutions of the driving motor and of the spindle nut body 11 and 11a driven by the latter. Since this number of revolutions depends in its reduction, however, upon received push- or pull-force, the rectangular pulses emerging from the multi-vibrator MV are then changed, when the pre-set pushing or pulling force is surpassed. The adjustable time constant, in the simplest manner, by change of the resistance R in FIG. 5, makes thus possible a simple limitation of the pushing and pulling forces, so that upon surpassing the pulse sequence of the mono-stabile multi-vibrator MV is changed. It can be, thus, readily seen that the position of the resistance value can be determined and calibrated directly into deliverable pushing- and pulling-force.

The rectangular pulses emerging from the mono-stabile multivibrator MV are transmitted to an impulse amplifier IS. This impulse amplifier IS does not react to the individual pulses, rather responds only, if the pulses follow successively without interruption. In the simplest, but not safest case as to its operation, this impulse amplifier IS can be designed as a sensitive relay, which does not respond normally and only responds if the rectangular pulses follow successively each other. This can be seen readily, since the directly succeeding rectangular pulses bring about a stronger excitement of the relay and bring about its response. With this response of the relay, it is possible to switch-off the excitement of the magnetic coupling 14 (Mü), as well as the excitement of the magnet brake 27 (MB) by means of a relay disposed therebehind instead of a controllable thermionic relay Sü, and thereby disconnect the spindle nut body 11 and 11a from the rotating rotor 3 and is retained by the magnet brake, while the motor can freely continue rotation.

If, however, emphasis is made for highest operational safety, then it is suitable to provide a bi-stable multi-vibrator IS instead the simple impulse amplifier by means of a relay, which bi-stable multi-vibrator is put into the second stable state and in turn, if desired, switches a controllable thermionic relay, as in the form of a silicium rectifier Sü. It is obvious to men skilled in the art and for this reason not particularly emphasized, that a locking can be provided between the turning relay combination, disclosed in FIG. 3, and the controllable thermionic relay or in a simple manner, the auxiliary relay, which locking brings about the effect that upon excitement of the magnetic coupling 14 and of the magnet brake 27, the motor is simultaneously switched-off.

The effect and necessity of the integrating retarding circuit IV (FIG. 4) in FIG. 3 is obtained from the showing in FIG. 7. In accordance with the statements set forth above, the motor could not obtain a high number of revolutions after being switched-on without the integrating retarding circuit, rather it would immediately shut-off, since the pulses emerging from the self induction coil G (25a) during the increase of the number of revolutions of the motor, increase in their frequency, so that already by this frequency change during the increase of the number of revolutions of the motor, the mono-stable multi-vibrator MV (FIG. 5) would respond. In order to avoid this, in accordance with the circuit in FIG. 3, a retarding circuit IV (FIG. 4) is provided between the self-induction coil G and the mono-stabile vibrator MV.

The pulses arriving from the self-induction coil G are limited by means of a rectifier in FIG. 4 to negative pulses, while the positive pulses are cancelled out. The emerging pulses charge at first the condenser C and make slowly dissapear a voltage on the adjustable resistance R, which voltage switches the transistor, so that only after the transistor has switched, the impulses are transmitted to the multi-vibrator MV. By adjustment of the resistance R, the retarding time period can be preselected, that means, the electromotive adjustment device can be accommodated to a heavy or light start with the different time periods. If the load of the adjustment device is too great, then upon termination of the retarding time period, the monostable vibrator MV will immediately respond due to the low pulse frequency and the adjustment device will be switched-off again.

In order to provide simultaneously a determination of the adjustment path, that means, in order to permit from the start only predetermined adjustment paths, at the end of which the adjustment device shuts-off automatically, FIG. 3 shows in addition a time member ZG which in turn operates the impulse amplifier IS. The time member ZG consists, in a known manner, of condensers and resistances and is fed from a direct current source. By an adjustable resistance (not shown) provided in this time member ZG, which resistance can be calibrated into time units or also into adjustment paths, each adjustment path can be determined in advance and can be pre-selected by proper adjustment.

The voltage source of the different electronic switching elements is not shown in the drawings, FIGS. 3, 4, 5, 8. For this purpose a constant voltage feed of a low voltage, as it is conventional for transistors, will suffice. As shown in FIG. 3, it is possible to switch-on the adjustment device once over the turning relay combination WS in accordance with the predetermined direction of rotation and also to switch it off. Furthermore, the possibility exists by a pulse signal "out" on the impulse amplifier IS to switch-off merely the magnetic coupling Mü and to permit further rotation of the motor M.

The provision of a temperature sensing device T, as sohwn in FIG. 8 can be omitted, since the magnetic coupling (Mü) releases the motor, as soon as an overload takes place, so that the motor cannot normally excessively overheat.

Referring now again to the drawings and in particular to FIG. 8, a circuit over an electromotoric adjustment device is disclosed, which in a simplified embodiment operates without the magnetic coupling Mü. Referring to the circuit disclosed in FIG. 3 and the description thereof set forth above, the operation of the circuit of FIG. 8 is clearly understood. It will suffice merely to mention that the temperature surveyance T of the motor winding works directly on the impulse amplifier IS over a bridge circuit B and switches-off the impulse amplifier IS, as soon as the bridge B looses its equilibrium. Contrary to the circuit of FIG. 3, the magnet brake MB of the adjusting device is connected electrically in FIG. 8 directly with the motor terminals M, so that it can be switched-on and off simultaneously with the motor M.

In order to obtain the highest degree of electrical safety in this adjustment device, which is operationally safe and contains only a few mechanically moved parts, in this circuit the control of the motor M and of the magnet brake MB is provided with switches S without contacts and complementary impulse sender IG.

Figure 9:
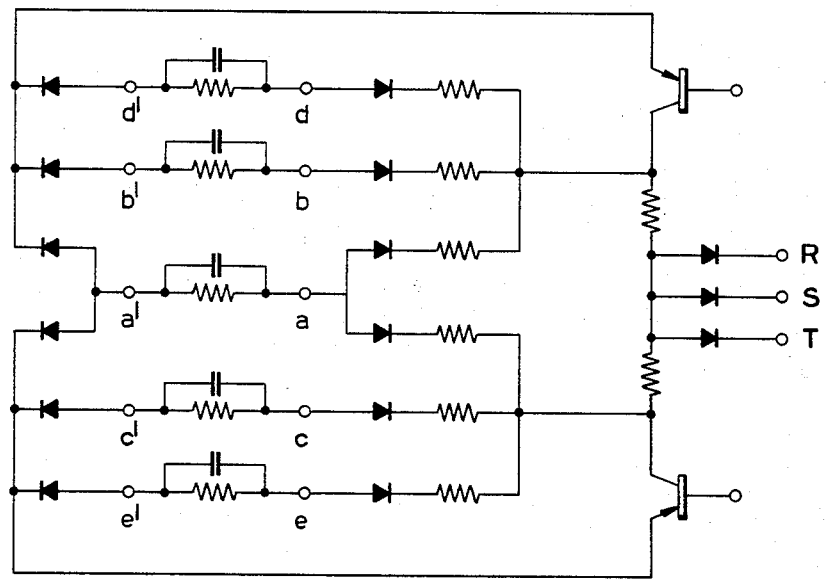
FIG. 9 is a circuit diagram of an embodiment of a turning circuit having no contacts for the motor.

Referring now to FIGS. 9 and 10, an embodiment is disclosed, by example, for a turning circuit having no contacts for the motor and a circuit for the necessary impulse sender for this turning circuit without contacts.

It is apparent without difficulty that if a number of revolutions of the motor of 1500 r.p.m. is assumed, the iron disc 25 with its teeth 25b can be designed such that in case of a correspondingly small self-induction coil 25a, an impulse frequency can be obtained with the number of revolutions of the motor of 1500 r.p.m., which amounts to a few thousand Hz. By such a high impulse succession, an appreciably shorter stopping time period for the motor can be obtained in combination with the control of the motor without contacts, as it was possible with the conventional relays with mechanical contacts.

Since by charging of the adjustment device over a set value, the impulse frequency changes without retardation, the control of the motor takes place thus practically without inertia, so that the movement of the spindle rod is likewise terminated without retardation.

This characteristics is achieved thus by the cooperation of the iron disc 25 which is equipped with the greatest possible number of teeth with a switching arrangement which has no contacts and is practically without inertia, and which switching arrangement makes possible a very exact positioning of the adjustment rod.

This combination provides the possibility to obtain an exact positioning of the spindle rod without subsequent run, so that merely the coil 27a of the stopping brake MB is rendered without crurent. The operation of the brake brings about the lowering of the number of revolutions of the motor and causes the stopping of the motor in the above-described manner.

While we have disclosed several embodiments of the present invention, it is to be understood that these embodiments are given by example only and not in a limiting sense, the scope of the present invention being determined in the objects and the claims.

We claim:
1. An electromotive adjusting device comprising:
a main outer housing,
an electric motor mounted in said main outer housing, and comprising a rotor and a stator surrounding said rotor,
a spindle nut co-axially disposed relative to and operated by said electric motor,
a spindle adjusting rod threadedly received in said spindle nut,
a magnet brake operatively connected with said spindle nut,
a drive magnet disposed axially adjacent said electric motor within said main outer housing and affecting said spindle nut and controllable for the maximum push and pull, respectively,
said drive magnet member constituting a disc-like structural unit and said magnet brake being disposed axially adjacent said drive magnet member and forming another structural unit,
a spindle nut body,
said spindle nut threadedly engaging said spindle adjusting rod being designed as an exchange spindle nut and mounted non-rotatably and not displaceably in said spindle nut body,
said exchange spindle nut being of a material providing the least friction losses and adjusted to the material of said spindle adjusting rod,
pressure bearings disposed in said housing,
said spindle nut body being mounted axially immovably between said pressure bearings,
said spindle nut body comprising two plug bushings interengaging over parts of their axial length connected with each other,
one of said plug bushings having a set-off portion and receiving said spindle nut and the latter sitting with one of its end faces axially on said set-off portion,
the other of said plug bushings having an axial neck portion projecting into said one of said plug bushings, the free end face of said axial neck portion engaging the other of the end faces of said spindle nut for the axial securing of the latter,
said other of said plug bushings having a radial collar overlapping the end face of said one of said plug bushings and being connected with the latter,
a driving force transmission member non-rotatably, but axially displaceably mounted about the periphery of said one of said plug bushings to move along feathers,
said driving force transmission member having C- to U-shaped cross-section and comprising two flanges axially spaced apart from each other and having different diameters,
a coupling magnet body,
one of said flanges having a larger diameter, being operatively connected with said coupling magnet body,
at least one of the oppositely disposed faces of said one of said flanges and of said coupling magnet body, respectively, having coupling grooves,
said coupling magnet body in its excited state connecting said driving force transmission member for joint rotation therewith,
a permanent magnet arrangement mounted on said one of said plug bushings,
the other of said flanges having smaller diameter being operatively connected with said permanent magnet arrangement upon switching-off said coupling magnet body,
an iron disc having teeth at its periphery constituting a control member and mounted axially spaced from said drive magnet on said one of said plug bushings,
at least one self-induction coil disposed axially at a small distance from and above said peripheral teeth of said iron disc, and
control pulses emerging from said self-induction coil serving, on the one hand, the control of the excitement of said coupling magnet and of said brake magnet, on the other hand, whereby said brake magnet having a braking effect during its de-exciting period.

2. The electromotive adjusting device, as set forth in claim 1, wherein:
said driving force transmission member comprises an iron disc.

3. The electromotive adjusting device, as set forth in claim 1, which includes:
electronic control members causing a stopping of the excitement of said coupling magnet body and of said magnet brake during lowering pulse frequencies in response to said control pulses as a measure for the number of revolutions and the released power of said motor.

4. The electromotive adjusting device, as set forth in claim 1, which includes:
at least one mono-stable multi-vibrator having a variable, adjustable time member and receiving said control pulse produced by said self-induction coil,
said time member being adapted for a timely variation of the intermediate stabile state of said multi-vibrator,
an adjustable resistance operatively connected with and adjusting said time member, and
an impulse amplifier causing the stopping of excitement of said magnet systems upon receiving a control impulse after run of prerated time period.

5. The electromotive adjusting device, as set forth in claim 4, wherein:
the resistance values indicating directly the pulling- or pushing-forces released by said electromotive adjusting device.

6. The electromotive adjusting device, as set forth in claim 4, wherein:
the resistance values indicating directly path units upon preselecting the adjustment path of said adjusting device by said time member.

7. The electromotive adjusting device, as set forth in claim 4, wherein:
said time member includes an adjustable resistance and constitutes an independent structural unit.

8. The electromotive adjusting device, as set forth in claim 4, which includes:
an integrating retarding circuit disposed between said mono-stable multi-vibrator,
said integrating retarding circuit receiving its energy solely from said control pulses of said self-induction coil and suppressing control pulses arising with increasing frequency during the start of said motor,
means for adjusting said retarding circuit during its operating time to the starting conditions of said adjusting device, and
said integrating retarding circuit including a diode to operate as a rectifier for pausing negative pulses only and suppressing positive pulses.

9. The electromotive adjusting device, as set forth in claim 8, which includes:
a relay adapted to operate as an impulse amplifier and receiving rectangular pulses emerging from said mono-stabile multi-vibrator,
said relay being operative upon variation of said rectangular pulses, and
an additional amplifying switching member through which said relay causes the stopping of excitement of said magnet arrangements.

10. The electromotive adjusting device, as set forth in claim 8, which includes:
a relay adapted to operate as an impulse amplifier and receiving rectangular pulses emerging from said mono-stabile multi-vibrator,
said relay being operative upon variation of said rectangular pulses, and
said relay stops directly said motor and lifts said magnet brake.

11. The electromotive adjusting device, as set forth in claim 4, which includes:
to self-induction coils,
two equal mono-stabile multi-vibrators receiving separately said control pulses from said two self-induction coils,
the time constants of said two mono-stabile multi-vibrators being adjusted relative to each other such that a constant direct voltage is produced at the joint output from said rectangular pulses of both said mono-stabile multi-vibrators, whereby the direct voltage has a gap upon increase of the timely spacing of said pulse, said gap being created suddenly at a predetermined pulse repetition rate, and
a following bistable multi-vibrator controlled by said voltage gap, said bistable multi-vibrator being changeable to a second stabile state and causing the stopping of excitement of both magnet arrangements.

12. The electromotive adjusting device, as set forth in claim 11, which includes:
means for locking one of said multi-vibrators by the other of said multi-vibrators upon a predetermined reduction of the pulse repetition rate, such that the output of said one of said multi-vibrators is free of voltage, said state being adapted to control said adjusting device.

13. The electromotive adjusting device, as set forth in claim 1, which includes:
a commutation circuit having no contacts and including thermionic relays for putting in and out of circuit, respectively, said motor,
an impulse sender having no contacts controlling said thermionic relays, and
an impulse amplifier controlling said impulse sender, and whereby the putting ont of circuit is initiated by stopping the excitement of said magnet brake.

14. The electromotive adjusting device, as set forth in claim 13, wherein:
said motor comprises a winding including temperature-responsive resistances controlling said impulse amplifier upon reaching a predetermined motor temperature.

15. The electromotive adjusting device, as set forth in claim 1, which includes:
a damping coupling member disposed at the driven end of said spindle adjusting rod, and said damping coupling member being adapted to operate as a coupling member.

16. The electromotive adjusting device, as set forth in claim 15, wherein:
said damping member comprises a rubber-metal connection.

No references cited.

ORIS L. RADER, *Primary Examiner.*

K. L. CROSSON, *Assistant Examiner.*